April 13, 1943.  E. R. BRAY  2,316,500
FISHING LINE RETRIEVER
Filed May 20, 1942
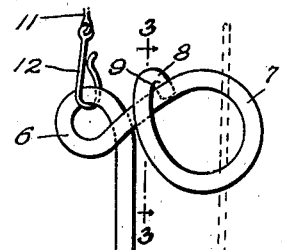
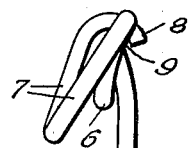
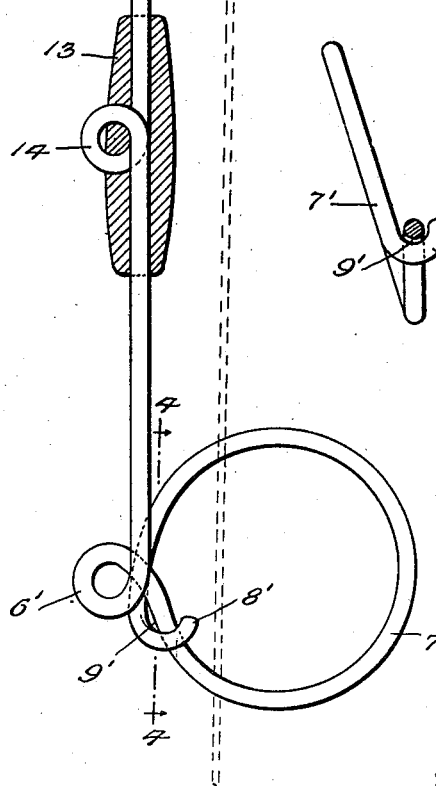
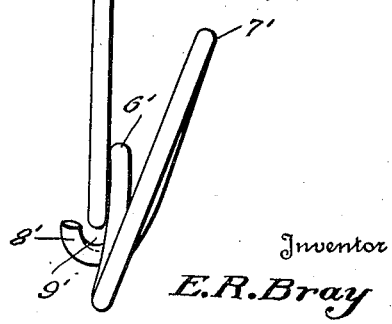
Inventor
E. R. Bray
By
H. B. Wilson & Co.
Attorneys

UNITED STATES PATENT OFFICE 2,316,500

FISHING LINE RETRIEVER

Elwyn R. Bray, St. Paul, Minn.

Application May 20, 1942, Serial No. 443,787

4 Claims. (Cl. 43—30)

The invention aims to provide a new and improved device to slide down a fishing line which has become snagged in rocks, roots, or the like, to loosen the snagged hook or hooks.

In carrying out the above end, a further object is to provide a device of the character set forth having two line-encircling rings of different sizes and at opposite ends of a weighted shaft, which device may be used either end down — — the small ring down on a line having a small spinner or other lure, and the large ring down on a line having a large lure, such as a "dare devil" or "wobbler."

A still further object is to provide a device of the character in question, in which the two line-encircling rings are disposed in planes sharply acute to the length of the shaft, permitting them to pass through narrow spaces between rocks, roots or the like, to readily reach the snagged hook or hooks.

Yet another object is to provide a device of exceptionally simple and inexpensive form, yet one which will be efficient to a high degree.

With the foregoing in view, the invention resides in the novel subject matter hereinafter described and claimed, description being accomplished by reference to the accompanying drawing.

Figure 1 is a side elevation.

Fig. 2 is an edge view.

Figs. 3 and 4 are detail vertical sectional views substantially on lines 3—3 and 4—4 of Fig. 1.

The device is constructed primarily from a single length of stiff wire, the major portion of which constitutes a shaft 5. The wire at the upper end of this shaft is bent into the form of a figure 8 having a small loop 6 at one side of said shaft and a larger loop 7 at the other side of said shaft, the end of the wire after forming the loop 7, being hooked around and spaced from a portion of this loop 7 as shown at 8, leaving an entrance throat 9 (Fig. 3) through which a fishing line 10 may pass to easily engage said line with the loop 7 without the necessity of slipping the loop endwise onto the line.

The wire at the lower end of the shaft 5 is also bent into the form of a figure 8, providing loops 6' and 7', a hook 8', and a throat 9' corresponding in function to the loops 6 and 7, the hook 8, and the throat 9 above described. The loop 7', however, is much larger than the loop 7. The device is used with this loop 7' downwardly as shown in Figs. 1 and 2, when it is to be downwardly slid upon a line having a relatively large lure or other encumbrance, but when used on a line having only a small lure or the like, the device is inverted and slid down the line with the loop 7 lowermost. The two small loops 6 and 6' form means for connecting a drop-line 11 with either end of the shaft 5, said drop-line being preferably provided with a snap-hook or the like 12 to engage either of said loops 6 or 6'.

Between its ends, the shaft 5 is provided with an appropriate weight 13 of any desired material. It is preferable to bend the wire forming the shaft into the form of an eye 14 and to cast the weight 13 around the shaft and a portion of the eye, as shown in Fig. 1. If desired, a portion of the eye 14 may project beyond the weight and an auxiliary weight or some implement which may be advantageous to the fisherman, may be engaged with said eye if desired. The weight 13 could of course be entirely omitted and some other kind of weight simply connected with the eye 14.

Due to the entrance throats 9 and 9', the eyes 7 and 7' may be quickly and easily engaged with a snagged line, and by means of the drop line 11, the entire device may then be lowered along said snagged line until it comes to rest, usually against the snagged hook. Then, by manipulating the device by up and down movements of the drop-line 11, said device may be made to dislodge the hook, freeing the line, whereupon the lines 10 and 11 may be drawn upwardly, either simultaneously or independently.

Excellent results are obtainable from the exact details shown and described and they are, therefore, preferably followed. However, within the scope of the invention as claimed, minor variations may be made.

Attention is invited to the fact that when the device is in use, the weight 13 acts directly down on the snagged hook instead of off to one side as in prior devices.

I claim:

1. A fishing line retriever comprising a single length of stiff wire whose major portion constitutes a shaft, the wire at one end of said shaft being bent into the form of a figure 8 having one small loop at one side of said shaft and a relatively large loop at the opposite side of said shaft, the wire at the other end of said shaft being also bent into the form of a figure 8 having a small loop at said one side of said shaft and a relatively large loop at said opposite side of said shaft, said large loops being of two different sizes and being adapted to surround and slide downwardly upon a snagged fishing line with either of said large loops disposed downwardly, said small loops providing means for connecting a drop-line with either end of said shaft, and a weight attached to the intermediate portion of said shaft.

2. A fishing line retriever comprising a single length of stiff wire whose major portion constitutes a shaft, the wire at one end of said shaft being bent into the form of a figure 8 having one small loop at one side of said shaft and a relatively large loop at the opposite side of said shaft, the wire at the other end of said shaft being also bent into the form of a figure 8 having a small loop at said one side of said shaft and a relatively large loop at said opposite side of said shaft, said large loops being of two different sizes and being adapted to surround and slide downwardly upon a snagged fishing line with either of said large loops disposed downwardly, the ends of said length of wire after forming said large loops being hooked around and spaced from portions of said large loops to allow easy engagement of these loops with the snagged line, said small loops providing means for connecting a drop-line with either end of said shaft and a weight attached to the intermediate portion of said shaft.

3. A fishing line retriever comprising a single length of stiff wire whose major portion constitutes a shaft, the wire at one end of said shaft being bent into the form of a figure 8 having one small loop at one side of said shaft and a relatively large loop at the opposite side of said shaft, the wire at the other end of said shaft being also bent into the form of a figure 8 having a small loop at said one side of said shaft and a relatively large loop at said opposite side of said shaft, said large loops being of two different sizes and being adapted to surround and slide downwardly upon a snagged fishing line with either of said large loops disposed downwardly, said large loops being disposed in planes sharply acute to the length of said shaft to allow them to pass through small spaces between rocks, roots and the like, said small loops providing means for connecting a drop-line with either end of said shaft, and a weight attached to the intermediate portion of said shaft.

4. A fishing line retriever comprising a single length of stiff wire whose major portion constitutes a shaft, the wire at one end of said shaft being bent into the form of a figure 8 having one small loop at one side of said shaft and a relatively large loop at the opposite side of said shaft, the wire at the other end of said shaft being also bent into the form of a figure 8 having a small loop at said one side of said shaft and a relatively large loop at said opposite side of said shaft, said large loops being of two different sizes and being adapted to surround and slide downwardly upon a snagged fishing line with either of said large loops disposed downwardly, the ends of said length of wire after forming said large loops being hooked around and spaced from portions of said large loops to allow easy engagement of these loops with the snagged line, said large loops being disposed in planes sharply acute to the length of said shaft to allow them to pass through small spaces between rocks, roots and the like, said small loops providing means for connecting a drop-line with either end of said shaft, and a weight attached to the intermediate portion of said shaft.

ELWYN R. BRAY.